United States Patent [19]

Brewer

[11] 4,434,018
[45] Feb. 28, 1984

[54] TIRE RETREADING SYSTEM WITH ENVELOPE PRESSURE

[75] Inventor: Donaldee Brewer, Muscatine, Iowa

[73] Assignee: Bandag, Incorporated, Muscatine, Iowa

[21] Appl. No.: 304,523

[22] Filed: Sep. 21, 1981

[51] Int. Cl.³ .......................... B29H 5/04; B29H 5/16
[52] U.S. Cl. .................................. 156/96; 156/128.6;
  156/130.3; 156/130.5; 156/356; 156/358;
  156/382; 156/909; 264/36; 425/14; 425/18
[58] Field of Search .................................. 156/95–96,
  156/126–127, 356, 358, 365, 381–382, 110 R,
  123, 128.1, 128.6, 130.3, 130.5, DIG. 909,
  394.1; 425/14, 17, 18; 264/36, 501

[56] References Cited

U.S. PATENT DOCUMENTS

| | | | |
|---|---|---|---|
| 3,325,326 | 6/1967 | Schelkmann | 156/96 |
| 4,151,027 | 4/1979 | Schelkmann et al. | 156/96 |
| 4,299,647 | 11/1981 | De Haven | 156/96 |

Primary Examiner—Lois E. Boland
Attorney, Agent, or Firm—Frank B. Hill

[57] ABSTRACT

The present invention covers the method and apparatus to retread tire casings using a precured tread system where an envelope or flexible fluid tight member is used to cover a retread tire casing assembly and then placed in an autoclave where the autoclave is pressurized and a reduced differential pressure is provided between the envelope member and the precured tread. This invention includes the automatic pressurizing of the system and the monitoring of the system during operation as a total system and/or for individual curing stations.

12 Claims, 10 Drawing Figures

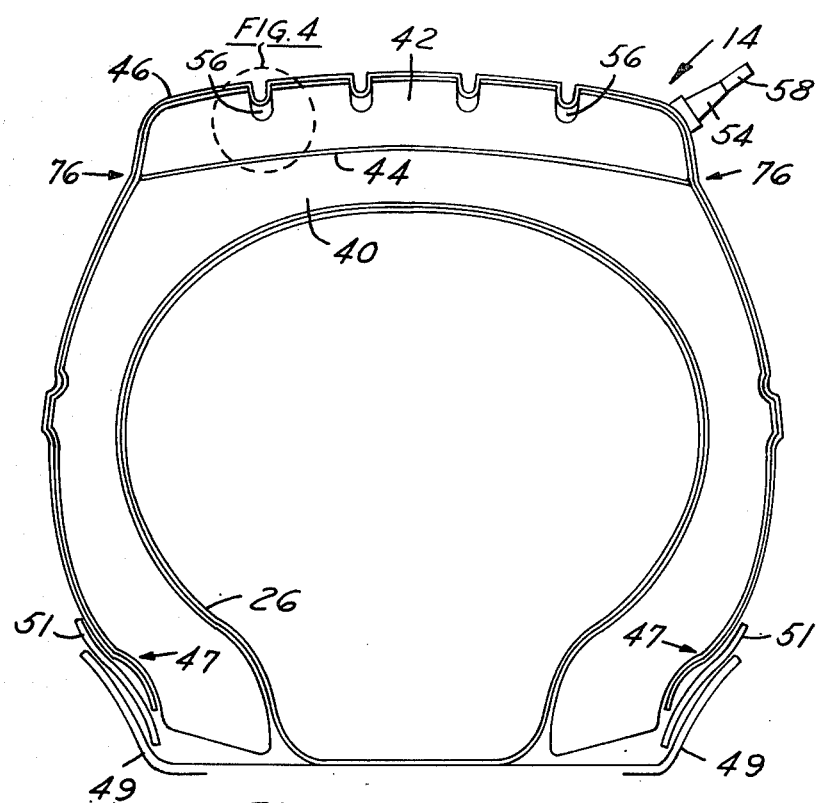
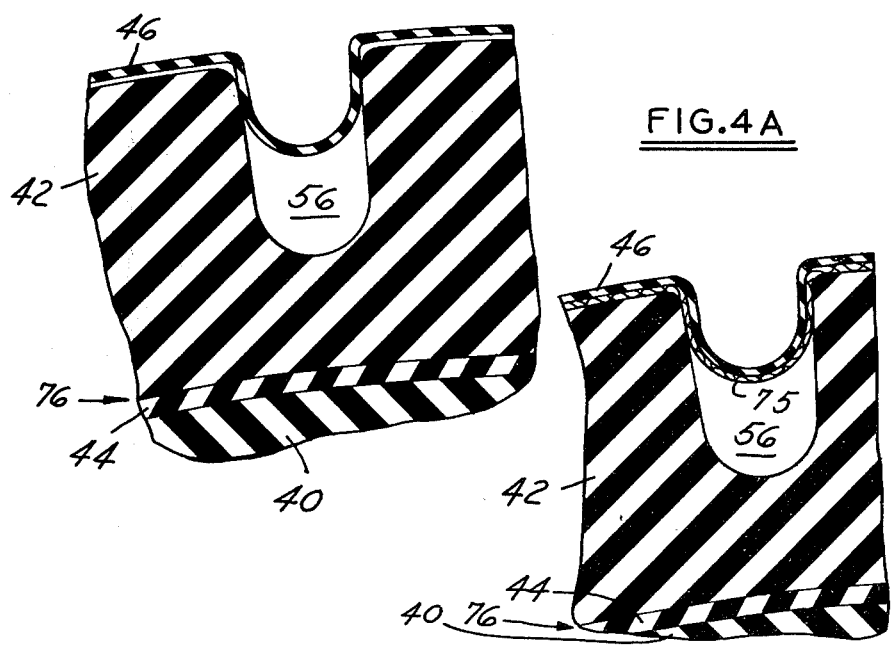

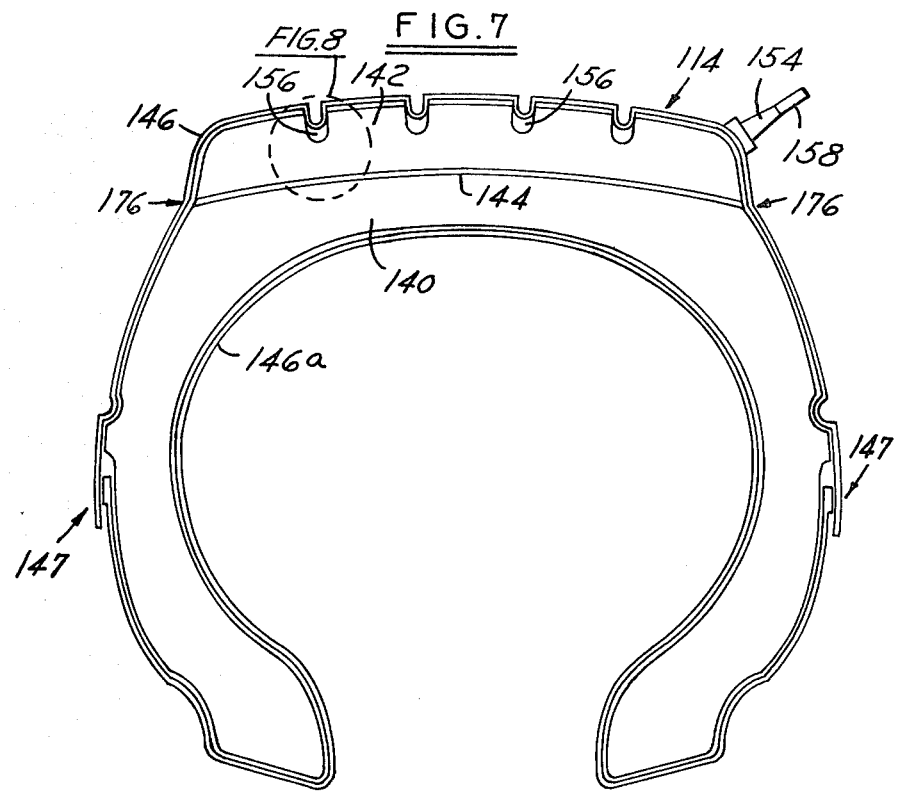
FIG. 7
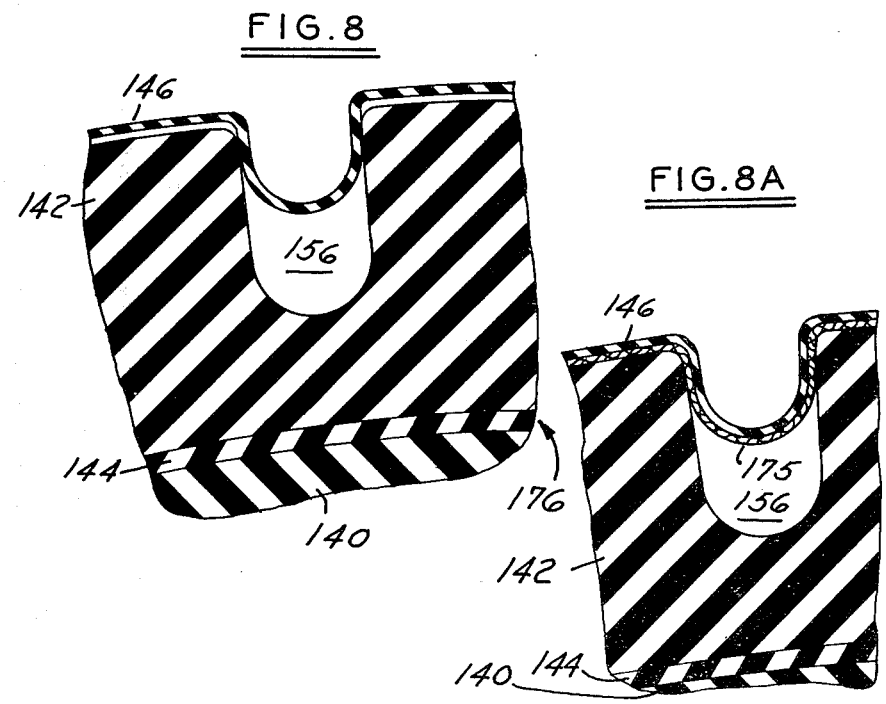
FIG. 8
FIG. 8A

4,434,018

TIRE RETREADING SYSTEM WITH ENVELOPE PRESSURE

BACKGROUND OF THE INVENTION

This invention relates to a retreading system including the method and apparatus for retreading tire casings with precured tread, using a flexible fluid tight member which covers the tread member. In this system of retreading, the flexible member is pressed against the tread by the fluid pressure applied to the exterior of the member so that the tread and tread casing are forced together. Simultaneously, heat is applied in order to vulcanize the rubber-based bonding medium which has been provided between the circumferential surface of the tire casing and the under-surface of the tread member.

It is conventional in this type of retreading to remove residual air from the space between the flexible member and the tread and tire casing, at one or more times during the process or continuously throughout the process. The air can be removed by connecting a conduit from the space between the flexible member and the tread member to the atmosphere or between the said space in a vacuum source. Removal of the air is accepted as an important feature of this type of retreading system because air can interfere with proper bonding of the tread to the tire casing and/or can result in deformation and/or improper seating of the tread member. It is important that the flexible member be fluid tight and be sealed to the tire casing in order to avoid leakage of pressure fluid through or past the flexible member into the space between the tread member and the tire casing. Leakage may produce the disadvantages referred to and thereby create a possibility of tire failure.

Examples of retreading systems employing the above summarized principles are described in detail in U.S. Pat. Nos. 2,966,936 (Schelkmann), 3,236,709 (Carver), 3,325,326 (Schelkmann), 3,745,084 (Schelkmann), 3,399,551 (Brodie et. al), 3,951,720 (Brodie), 4,075,047 (Brodie et. al), and 4,151,027 (Schelkman et. al). U.S. Pat. Nos. 3,325,326 and 4,151,027 disclose the concept of feeding the pressure fluid into the space between the flexible member and the assembly of the tire casing and tread so as to maintain a pressure differential between the inside and outside of the flexible fluid tight member.

SUMMARY OF THE INVENTION

The present invention provides a method and apparatus for providing pressure on the tread material in a uniform manner. This system overcomes or at least reduces the adverse effects of fluid pressure leakage into the space between the flexible member and the assembly of tire casing and tire member during a retreading operation. The technique includes automatically pressure loading the system by supplying fluid pressure to the autoclave and the space between the envelope and the tread material in a manner to maintain a pre-determined pressure differential between the inside and the outside of the flexible member and in the event of a leak of fluid pressure into the space automatically venting the resulting excess pressure from the space.

In the preferred embodiment the pressure differential between the flexible member or envelope and the autoclave or pressure vessel is accomplished by means of a special connection passing the pressure from the interior of the autoclave or pressure vessel to the assembly of flexible member, tire casing and tread member during the retreading cycle. The connection includes a conduit system for supplying fluid pressure from the vessel to the space between the flexible member and the tread member at a lower pressure than the pressure in the vessel. The conduit system contains a pressure regulator for this purpose.

The conduit system also includes a pressure relief valve which will vent excessive pressure from the space in the event of a leak of pressure fluid from the vessel through the liquid type flexible member. Means are also provided for initially removing entrapped air from the space. A means may include a valve having a first position in which the space is placed in communication with either the atmosphere or a vacuum source and a second position in which the space is placed in communication with the downstream pressure of the pressure regulator and a third position where the system is completely turned off.

DETAILED DESCRIPTION

The invention will be further understood from the following more detailed description taken with the drawings in which:

FIG. 3 is a cross-section of the tire assembly as mounted in FIG. 1 taken along line 3—3 of FIG. 1;

FIG. 4 is a view taken from the circled area of FIG. 3 illustrating the envelope's action on the groove and the pressure differential of the system;

FIG. 4A is a view similar to FIG. 4 showing a wicking material positioned between the envelope and the tread material;

FIG. 7 is a cross-sectional view of the tire assembly as mounted in FIG. 5 taken along line 7—7 of FIG. 5;

FIG. 8 is a view taken from the circled area of FIG. 7 illustrating the envelope and tread relationship of the figure shown in FIG. 7; and FIG. 8A is a view similar to FIG. 8 illustrating a wicking material positioned between the envelope and the tread material.

Figure 1:
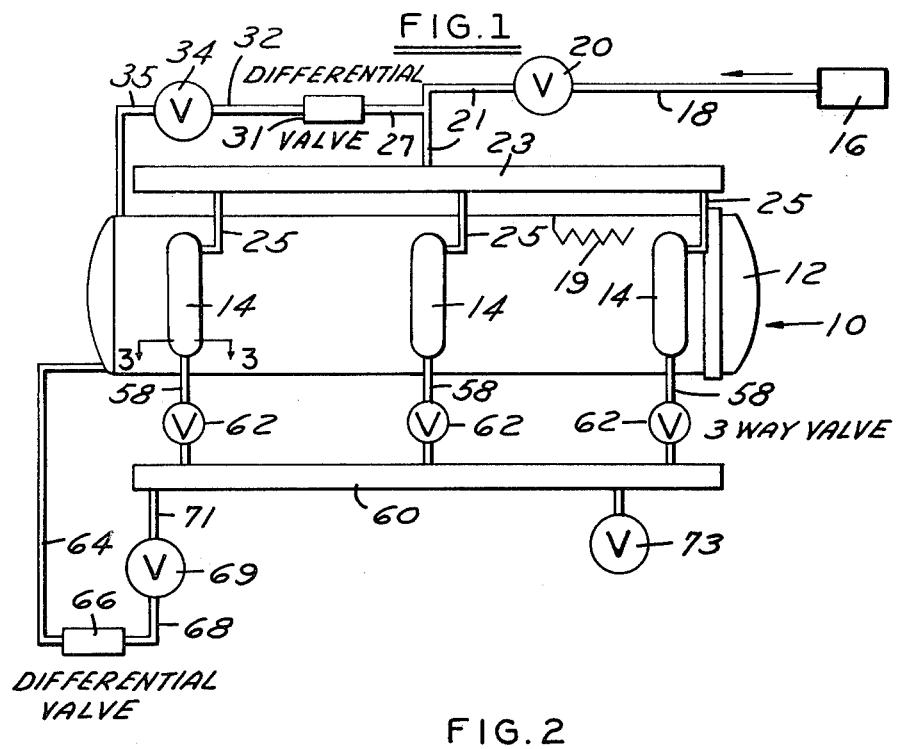
FIG. 1 is a schematic view of a tire retreading system illustrating the principals of the present invention.

Referring generally to FIG. 1, there is illustrated a tire retreading system including an autoclave or pressure vessel generally referred to as 10 which is adapted to receive through an enclosure 12 a plurality of tire assemblies 14 for retreading. The interior of the vessel 10 can be pressurized from a fluid pressure source 16 by way of a shop pressure line 18 with air, water, steam or a mixture of steam and air. The pressurizing medium is heated either before introduction into the vessel or after introduction by means of a heater as identified by numeral 19 located in the vessel 10. The shop pressure line 18 may be pressurized at approximately 150 psi for example. The line 18 is connected to regulator valve 20 which adds pressure up to 115 psi and then closed. A line 21 passes fluid to a tire inflation manifold 23 from valve 20. The fluid passes from the manifold 23 through tire inflation lines 25 which inflate the curing tube 26 of the tires to a pre-determined pressure of 115 psi as will be explained in more detail later. A pressure vessel fill line 27 is connected to line 21 between valve 20 and the manifold 23. The line 27 connects to a pressure differential check valve 31 which opens when the pressure in line 27 is 30 psi higher than the downstream pressure past valve 31. A line 32 connects the valve 31 to a pressure regulator valve 34 which will close when the pressure in line 32 reaches 85 psi. A line 35 connects the valve 34 to the pressure vessel 10.

Each tire assembly 14, best viewed in FIG. 3, includes a tire casing 40, a precured tread 42 and a layer of rubber-base bonding material 44, sometimes referred to as cushion gum, between the under surface of the tread 42 and the crown surface of the tire casing 40. A flexible fluid tight member 46 sometimes referred to as an envelope is made of rubber, for example, overlies the tread 42. The illustrated embodiment in FIG. 3 is illustrated that the member 46 is held in sealing contact to the sidewalls of the tire casing 40 at location 47 and that the tire casing is inflated as disclosed for example in U.S. Pat. No. 4,075,047. A tire casing 40 is mounted on a rim 49 with a flange member 51 positioned on the rim. The envelope member 46 is positioned between the flange and the tire casing 40. Pressure in the curing tube 26 forces the envelope 46 into sealing contact with the tire casing 40 along the area designated as 47. The flexible member 46 is provided with a fitting 54 which places the space 56 between the envelope 46 and the tread 42 with the conduit 58. Conduits 58 pass through the pressure vessel 10 and connect with an envelope manifold 60 as shown in FIG. 1. Along the path of conduit 58 is provided a valve member 62. Valve member 62 has three positions. It can be closed, it can be open to the envelope manifold or it can be open to atmosphere.

The overall function of the illustrated system is, of course, to pressurize the tread 42 against the tire casing 40 by means of fluid in the vessel 10 and simultaneously to heat the bonding material or cushion gum 44 to a temperature at which it can be vulcanized securing the tread to the tire casing. A line 64 connects the chamber to a pressure differential check valve 66. The pressure differential valve 66 will pass fluid to a line 68 when the pressure line 64 reaches 15 psi. Line 68 connects valve 66 to pressure regulator valve 69. Pressure regulator valve 69 is connected to the envelope manifold 60 by line 71. When fluid pressure starts passing valve 66, pressure regulator valve 69 will remain open until the pressure in line 71 reaches 70 psi for example, at which time it will close down and will not permit any more pressurized fluid to pass into the envelope manifold. Connected to the envelope manifold is a relief valve 73 which will open if the pressure in the envelope manifold reaches 78 psi for example.

The system is prepared for operation when the pressure vessel 10 has the enclosure 12 open and a series of tire assemblies 14 can be suspended in the system. When the tire assemblies 14 are placed in the autoclave, the tire inflation lines 25 are connected to the curing tubes 26 and the envelopes are connected to the conduits 58. Then the enclosure 12 is closed and locked and the system is started. At the start of the system, the pressure from the fluid pressure source 16 will pass down to the regulator valve 20 through line 18. This pressurized fluid will pass into line 21 into the tire inflation manifold 23. At the same time the pressure will also pass into fill line 27. The differential check valve 31 will not open until the pressure in the line 21 has reached 30 psi. At this time the curing tube 26 will be putting a 30-pound pressure inside the tire casing and the chamber pressure will be at atmospheric pressure. The differential valve 31 will open and pass pressure into line 32 which will pass pressure through the pressure regulator valve 34 into line 35 which in turn passes this into the inside of the pressure vessel 10, sometimes referred to as chamber. Note we refer to the pressure in the vessel 10 as the chamber pressure on some occasions. When the chamber pressure reaches 15 psi then the pressure in line 64 will be 15 psi. At this time the differential check valve 66 will open and start passing the pressurized fluid into line 68 through the valve 69 into the line 71 on into the manifold 60 and through the conduits 58 into the envelope 46. This will continue until the pressure in the curing tube 26 reaches 115 psi. At this time the pressure in the chamber will be 85 psi and the pressure regulator valve 34 will close. The pressure in the envelope manifold 60 will be 70 psi and the pressure regulator valve 69 will close. The system will be stabilized and the curing cycle will be started.

Figure 2:
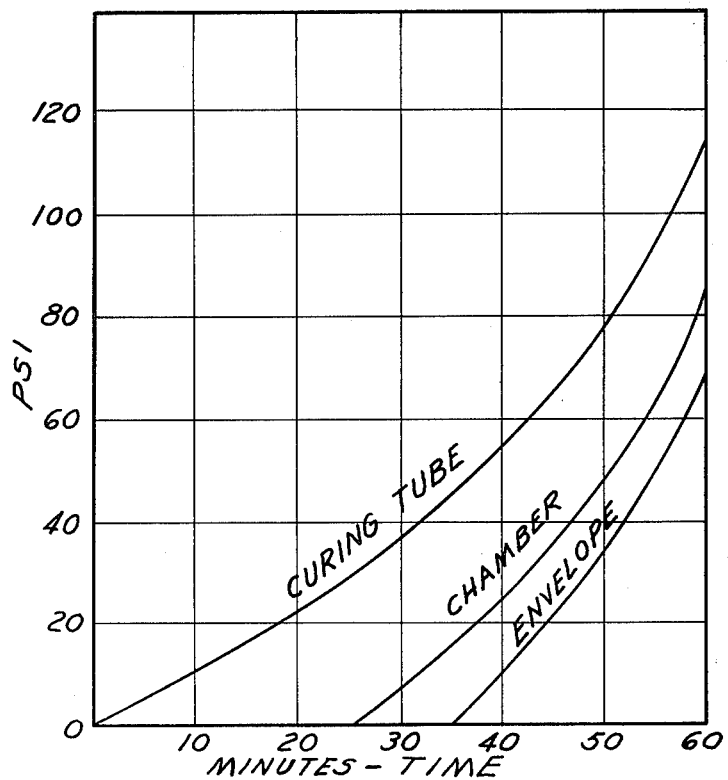
FIG. 2 is a graph illustrating the pressure and time relationship between the curing tube, the chamber and the envelope, illustrating automatic pressurization of the system illustrated in FIG. 1.

Referring to FIG. 2 this is graphically illustrated in reference to the pressure and time. For example, the curing tube will be inflated for approximately 25 minutes to the 30 psi level. At that time the chamber will start filling and when the chamber reaches 15 psi, the curing tube will be at approximately 40 psi. Then the envelope will start receiving pressure. It will continue in this way for approximately 60 minutes when the curing tube will be at 115 psi and the chamber pressure will be 85 psi and the envelope pressure will be 70 psi.

If during the curing cycle at any time one of the tire assemblies 14 would experience a leak in their flexible fluid tight member 46, the air would pass from the chamber into the envelope space 56 through conduit 58 into the envelope manifold 60. The pressure will not be able to go through the pressure regulator valve 69, but if the leak is severe, it will open up relief valve 78. If it is a small leak, it should not do any damage in the system and the pressure can be maintained at 78 psi and not damage the cure in the tire assemblies. If there is a large gush of air, an operator can go over and by manipulating the valve member 62 he can determine which tire is leaking. If it is too severe, he can open that tire to the atmosphere which will prevent any damage occurring to the other tires in the system. If for example there is no tire in the particular station, then the valve 62 can be closed and it will not affect or be affected by the system.

Referring generally to FIG. 4A, there is illustrated a wicking material 75. This can be used to be placed between the tread material 42 and the envelope 46 so as to permit easy flow of the fluid into and out of the envelope space 56. It is recommended that when the wicking material 75 is used that it be placed all the way across the tread material extending below the bond line 76 on both sides of the tire casing 40.

Figure 5:
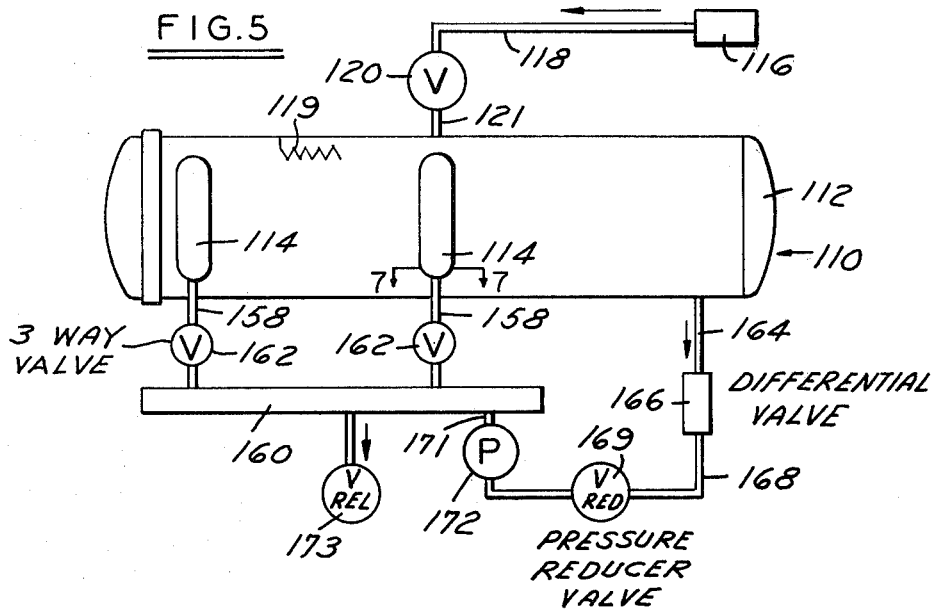
FIG. 5 is a schematic view of a tire retreading system illustrating the principals of the present invention.

Another embodiment illustrating the present invention is disclosed in FIG. 5. We have an autoclave or pressurized vessel 110 which has an enclosure 112. There are tire assemblies 114 positioned inside the autoclave 110. We have a fluid pressure source 116 which is connected to a pressure regulator valve 120 by shop pressure line 118. The pressurizing median is similar to that discussed in reference to FIG. 1 and a heater 119 is positioned in chamber 110. The pressure regulator valve 120 is set to close when the pressure reaches 85 psi. The pressure regulator valve 120 is connected to the chamber 110 by line 121. The tire assembly 114, shown in FIG. 3 in this embodiment has a tire casing 140 and precured tread 142. A cushion gum or bonding material 144 is positioned between the precured tread 142 and the tire casing 140 to bond the tread to the tire casing. The tire casing and tread forms a tire assembly 114. The flexible fluid tight member or envelope is in outer envelope 146 covering the outside portion and an inner envelope 146A which covers the inside portion. Sealing takes place between the envelope members indicated generally at 147. Therefore, the pressure inside the chamber of 85 psi will also be within the tire casing and outside the tire casing forcing the envelopes 146 and 146A against the tire casing as illustrated in FIG. 7. A fitting 154 connects to a conduit 158 which connects to the envelope manifold 160, shown in FIG. 5. Positioned along the conduit 158 is a valve member 162. Valve member 162 has three positions. It can be connected to the atmosphere, it can be shut off or it can connect the envelope to the envelope manifold 160. A line 164 runs from the pressure chamber 110 to a pressure differential check valve 166. Valve 166 will open up when the pressure in chamber 110 reaches 15 psi. Line 168 connects the check valve 166 to a pressure regulator valve 169. Pressure valve 169 is connected to the envelope manifold 160 by line 171. A vacuum pump 172 is connected to line 171 and its function will be explained in more detail later. A relief valve 173 is connected to the envelope manifold 160. The pressure relief valve is set to go off for example at 78 psi.

Figure 6:
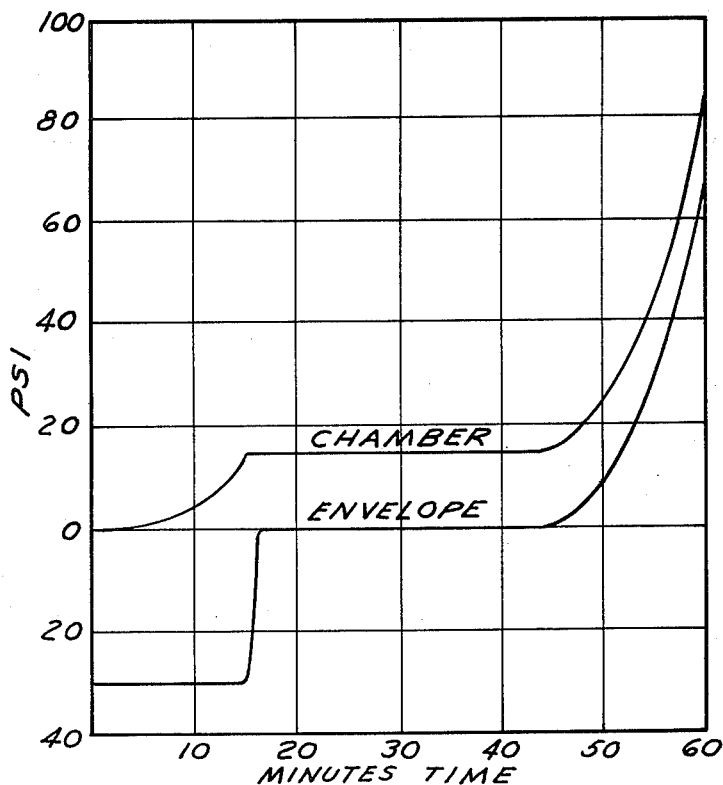
FIG. 6 is a graph illustrating the pressure and time relationship of the chamber and envelope, illustrating automatic pressurization of the retreading system illustrated in FIG. 5.

This system will operate by providing a tire assembly 114 inside the pressure vessel 110 and connecting the envelope by conduit 158 to the envelope manifold 160. After the tire assemblies 114 have been connected and the enclosure 112 closed and secured, the vacuum pump 172 will be opened to line 171 and the pressure regulator valve 169 will be closed. The vacuum pump will draw for example 28 inch vacuum pressure on the manifold. This will draw a pressure on the tire assembly 114 holding the envelopes 146 and 146A securely in contact with the tire casing 140. The fluid pressure source 116 will be opened passing pressurized fluid through the shop pressure line 118 to the pressure regulator valve 120 which will in turn pass the fluid pressure through line 121 into the chamber 110. When the pressure in the chamber reaches 15 psi, the vacuum pump is shut off and the pressure regulator valve 169 is opened. At this time the envelope pressure will be changed from a 28 inch vacuum pressure to atmospheric or zero pressure. In the present illustration the chamber pressure is held at 15 psi for appoximately 30 minutes while the temperature in the chamber rises to 160 degrees Fahrenheit. When the temperature reaches 160 degrees Fahrenheit for example, valve 120 will be opened again and at this time the envelope and the chamber will maintain an approximate 15 psi differential and it will take about 15 minutes for the chamber to rise to the 85 psi pressure at which time pressure regulator valve 120 will shut off. If during curing any of the envelopes 114 would experience a leak, relief valve 173 will open up to the atmosphere when the pressure in the envelope manifold 160 reaches 78 psi. If this is a large discharge, an operator can go along checking the valve members 162 to determine the individual tire which is causing the problem and either open it to atmosphere or turn the system off, thus preventing other tires from being contaminated by the injured envelope 146. Referring to FIG. 6 there is illustrated the envelope at the start of the curing being at a vacuum of 28 inches. Approximately 15 minutes into the cycle when the chamber has risen to 15 psi, the vacuum will be shut off and the envelope back pressure will go to zero. This condition will maintain itself as stated above for approximately 30 minutes at which time the curve illustrates the system going up to curing conditions where the chamber pressure is 85 psi and the envelope back pressure will be 70 psi.

FIG. 8 illustrates the condition of the envelope with the tread and a bond line 176 and the tire casing 140, similar to FIG. 4. FIG. 8A discloses a wicking material 175 which can be utilized in some applications being placed between the envelope 146 and the tire tread 142 permitting any air to be evacuated through the wicking material through fitting 154 through the conduit 158, similar to FIG. 4A. It is recommended when this is necessary that the wicking material be extended below the bonding lines 176 from one side of the assembly 114 to the other side. While the preferred embodiments of the retreading system have been shown and described herein in detail, those skilled in the art will recognize various alternative design embodiment for practicing the present invention as defined by the following claims.

What is claimed is:

1. In a method of retreading a tire casing which includes the steps of applying a precured rubber tread to the periphery of a tire casing, having side walls, with a layer of vulcanizable rubber-base material interposed between the tread and the tire casing, covering the tread and at least the adjacent side walls of the tire casing with a flexible airtight cover, and applying fluid pressure to the interior of a vessel containing the flexible airtight cover, tread and tire casing in order to press the flexible airtight cover against the assembly of tread and the tire casing, the improvement which comprises supplying fluid pressure from the vessel through a pressure differential check valve to a cover manifold positioned outside the vessel at a predetermined pressure less than said vessel pressure and supplying fluid pressure to the flexible airtight cover from said cover manifold.

2. A method as in claim 1 wherein said check valve supplies fluid pressure to said cover manifold through a pressure regulator valve.

3. A method as in claim 2 wherein said check valve is set at a value of approximately 15 psi and said regulator valve is set at approximately 70 psi.

4. A method as in claim 1 wherein a relief means is supplied to said cover manifold to release pressure should the pressure in said cover manifold increase a set amount over predetermined pressure.

5. In a method of retreading a tire casing which includes the steps of applying a precured rubber tread to the periphery of a tire casing, having side walls, with a layer of vulcanizable rubber-base material interposed between the tread and the tire casing, covering the tread and at least the adjacent side walls of the tire casing with a flexible airtight cover, mounting said tire casings on a rim member and sealing the flexible airtight cover member between extended flanges of the rim and the side walls, placing said mounted tire assemblies in a vessel, and applying fluid pressure to the interior of a vessel containing the tire assemblies in order to press the flexible airtight cover against the assembly of tread and the tire casing, the improvement which comprises supplying fluid pressure from the vessel through a pressure differential check valve to a cover manifold positioned outside the vessel at a predetermined pressure less than said vessel pressure and supplying fluid pressure to the flexible airtight cover from said cover manifold.

6. A method as in claim 5 wherein said check valve supplies fluid pressure to said cover manifold through a pressure regulator valve.

7. A method as in claim 6 wherein said check valve is set at a value of approximately 15 psi and said regulator valve is set at approximately 70 psi.

8. A method as in claim 5 wherein a relief means is supplied to said cover manifold to release pressure should the pressure in said cover manifold increase a set amount over predetermined pressure.

9. In a method of retreading a tire casing which includes the steps of applying a precured rubber tread to the periphery of a tire casing, having side walls, with a layer of vulcanizable rubber-base material interposed between the tread and the tire casing, covering the tread and the tire casing with a flexible airtight covering, forming a tire assembly, and applying fluid pressure to the interior of a vessel containing said tire assembly in order to press the flxible airtight cover against the assembly of tread and the tire casing, the improvement which comprises supplying fluid pressure from the vessel through a pressure differential check valve to a cover manifold positioned outside the vessel at a predetermined pressure less than said vessel pressure and supplying fluid pressure to the flexible airtight cover from said cover manifold.

10. A method as in claim 9 wherein said check valve supplies fluid pressure to said cover manifold through a pressure regulator valve.

11. A method as in claim 10 wherein said check valve is set at a value of approximately 15 psi and said regulator valve is set at approximately 70 psi.

12. A method as in claim 9 wherein a relief means is supplied to said cover manifold to release pressure should the pressure in said cover manifold increase a set amount over predetermined pressure.

* * * * *